(12) United States Patent
Bhatia et al.

(10) Patent No.: US 10,763,902 B2
(45) Date of Patent: Sep. 1, 2020

(54) REMOTE SPECTRUM ANALYSIS OF TRANSMIT BANDS IN COMMUNICATION SYSTEMS

(71) Applicant: MaxLinear, Inc., Carlsbad, CA (US)

(72) Inventors: Rahul Bhatia, Carlsbad, CA (US); Kenneth Scott Walley, Carlsbad, CA (US); Masoud Koochakzadeh, Carlsbad, CA (US); Jesson John, Carlsbad, CA (US)

(73) Assignee: MaxLinear, Inc., Carlsbad, CA (US)

(*) Notice: Subject to any disclaimer, the term of this patent is extended or adjusted under 35 U.S.C. 154(b) by 0 days.

(21) Appl. No.: 15/388,765

(22) Filed: Dec. 22, 2016

(65) Prior Publication Data

US 2017/0187400 A1 Jun. 29, 2017

Related U.S. Application Data

(60) Provisional application No. 62/387,256, filed on Dec. 23, 2015.

(51) Int. Cl.
*H04B 1/04* (2006.01)
*H04B 17/10* (2015.01)
(Continued)

(52) U.S. Cl.
CPC .......... *H04B 1/0475* (2013.01); *H04B 17/10* (2015.01); *H04B 17/101* (2015.01); *H04B 17/18* (2015.01);
(Continued)

(58) Field of Classification Search
CPC ........ H04B 1/0475; H04B 17/10; H04B 3/46;
H04B 1/40; H04B 17/18; H04B 17/309;
H04B 17/345; H04B 17/101; H04B 17/16; H04B 3/20; H04L 25/08; H04N 21/6118; H04N 21/6168; H04N 7/17309
(Continued)

(56) References Cited

U.S. PATENT DOCUMENTS 6,772,437 B1 * 8/2004 Cooper .............. H04N 7/17309
348/192
2005/0193424 A1 * 9/2005 Matsuura ................ H03J 5/244
725/127
(Continued)

*Primary Examiner* — Betsy Deppe
(74) *Attorney, Agent, or Firm* — Maschoff Brennan

(57) ABSTRACT

Systems and methods are provided for utilizing remote spectrum analysis of transmit bands in communication systems. A transmit band spectrum corresponding to a transmit band used in transmitting signals may be captured. The captured transmit band spectrum may be processed, and based on such processing presence of noise, distortion, interference, etc. in the transmit band spectrum may be detected, wherein the noise, distortion, interference, etc. may be introduced by one or more other systems sharing a medium used in the transmitting of the signals. One or more characteristic associated with each instance of detected noise, distortion, interference, etc. may be determined. Reporting information, related to the detection of noise, distortion, interference, etc. and/or to the determined one or more characteristics associated with each instance of detected noise, distortion, interference, etc., may be determined, and the reported information may be sent to at least one remote system.

20 Claims, 4 Drawing Sheets

(51) Int. Cl.
*H04B 17/345* (2015.01)
*H04B 17/18* (2015.01)
*H04N 21/61* (2011.01)

(52) U.S. Cl.
CPC ....... *H04B 17/345* (2015.01); *H04N 21/6118* (2013.01)

(58) Field of Classification Search
USPC ........................................ 725/112, 111, 118
See application file for complete search history.

(56) References Cited

U.S. PATENT DOCUMENTS

2016/0028496 A1* 1/2016 Currivan ................ H04B 17/18
375/222
2016/0050127 A1* 2/2016 Prodan .................... H04B 3/46
375/222
2016/0286268 A1* 9/2016 Robertson ........ H04N 21/44245

\* cited by examiner

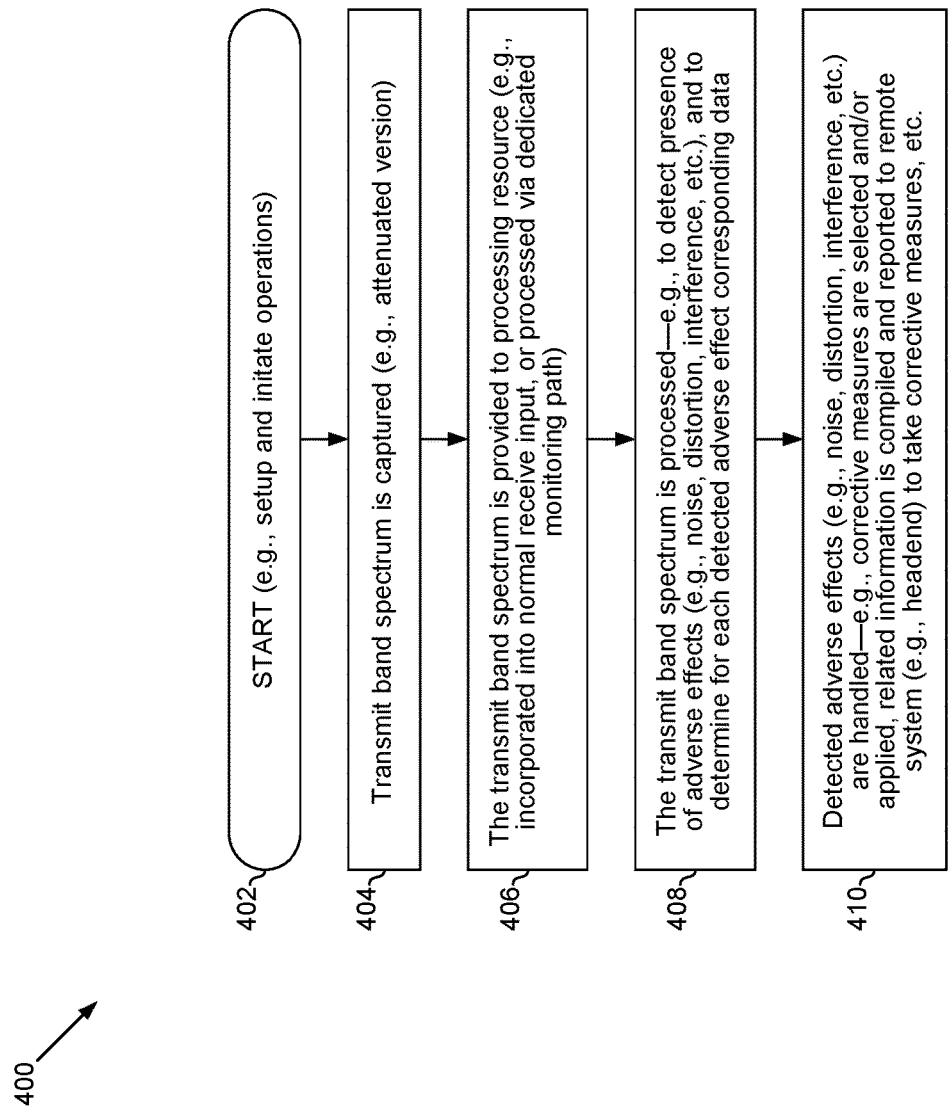

REMOTE SPECTRUM ANALYSIS OF TRANSMIT BANDS IN COMMUNICATION SYSTEMS

CLAIM OF PRIORITY

This patent application makes reference to, claims priority to and claims benefit from U.S. Provisional Patent Application Ser. No. 62/387,256, filed Dec. 23, 2015. The above identified application is hereby incorporated herein by reference in its entirety.

TECHNICAL FIELD

Aspects of the present disclosure relate to communications. More specifically, certain implementations of the present disclosure relate to methods and systems for a remote spectrum analysis of transmit bands in communication systems.

BACKGROUND

Various issues may exist with conventional approaches for managing transmit bands and/or receive bands in communication systems. For example, conventional systems and methods, if any existed, for handling adverse effects (e.g., noise, distortion, interference, etc.) in transmit bands may be costly and/or inefficient.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for a remote spectrum analysis of transmit bands in communication systems, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 4 illustrates a flowchart of an example process for utilizing spectrum analysis of transmit bands, in accordance with the present disclosure.

DETAILED DESCRIPTION OF THE INVENTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g.," set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1:
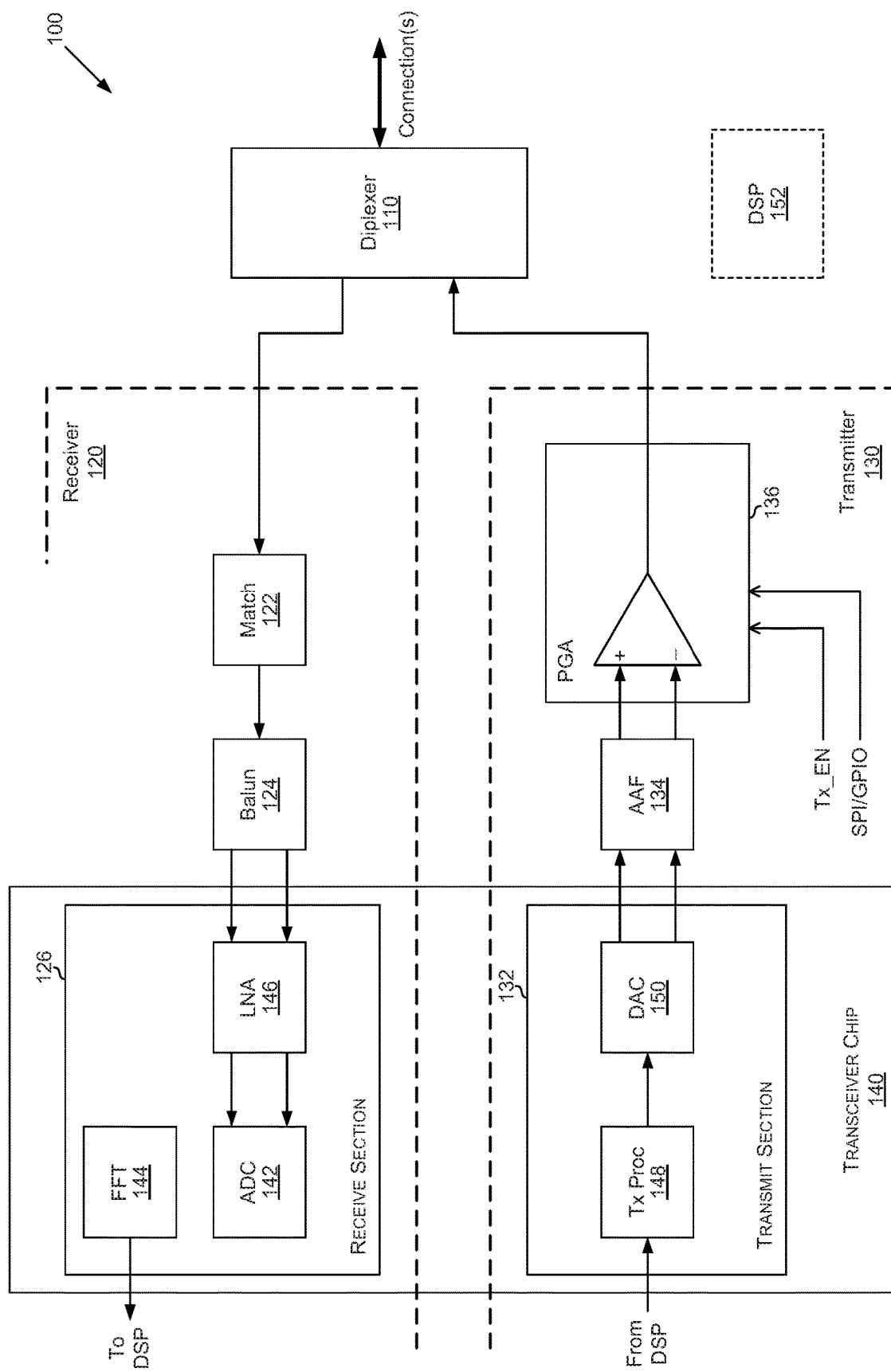
FIG. 1 illustrates an example transmit/receive architecture that does not use spectrum analysis of the transmit band.

FIG. 1 illustrates an example transmit/receive architecture that does not use spectrum analysis of the transmit band. Shown in FIG. 1 is transmit/receive (Tx/Rx) circuitry 100.

The Tx/Rx circuitry 100 is operable to support transmitting and/or receiving signals over wireless and/or wired interfaces. In this regard, the Tx/Rx circuitry 100 may be implemented and/or used in a suitable communication system to facilitate communication of signals to and/or from the system, such as within a network comprising that system.

In a non-limiting example use scenario, the Tx/Rx circuitry 100 may be implemented and/or used in a cable modem (or gateway), such as to communicate signals to and/or from the cable modem within a cable network, over wired connections (e.g., via coaxial or twisted-pair cables). In this regard, the Tx/Rx circuitry 100 may enable or support communication (transmission and/or reception) of signals between the cable modem and remote systems (e.g., cable head-ends) and/or local systems (e.g., other systems, such as end-user devices, co-located with a system that comprises the Tx/Rx circuitry 100, in a particular physical space, such as a home network).

In such use scenario, the Tx/Rx circuitry 100 may be configured for communication of cable (e.g., DOCSIS) based signals, such as during communications with cable head-ends, Multimedia over Coaxial Alliance (MoCA) based signals, such as during communications with other (local) devices or systems, etc. Thus, at least some of the signal transmission in the Tx/Rx circuitry 100 may correspond to communication (transmission) of cable upstream (US) streams, and at least some of the signal reception in the Tx/Rx circuitry 100 may correspond to communication (reception) of cable downstream (DS) streams. Nonetheless, the disclosure is not limited to these types of signals, and implementations in accordance with the disclosure may be applied in substantially similar manner with any suitable type of signals and/or communications where similar issues as noted through the disclosure may be encountered.

The Tx/Rx circuitry 100 may comprise suitable circuits for supporting transmission and/or reception of signals. As shown in the example implementation illustrated in FIG. 1, for example, the Tx/Rx circuitry 100 may comprise a diplexer 110, a receiver 120, and a transmitter 130. Further, a digital signal processor (DSP) 152 may be used for providing various processing functions associated with the transmission and reception of signals, particular digital processing functions. For example, the DSP 152 may handle embedding digital data into transmitted signals and/or processing such digital data to be embedded, and/or extracting and processing digital data extracted from received signals.

As shown in FIG. 1, the Tx/Rx circuitry may comprise a single transceiver chip 140, which comprises separate sections, each configured for handling at least some of the functions or operations relating to transmission and/or reception of signals—e.g., a receive section 126, and a transmit section 132, as shown in FIG. 1.

The diplexer 110 may comprise suitable circuitry for selectively controlling passing or blocking (e.g., by filtering) signals during communication to/from the Tx/Rx circuitry 100. In this regard, the diplexer 110 may selectively control passing and/or blocking signals in particular bands in one or both directions. The diplexer 110 may be configured as a switchable or a fixed diplexer. In an example implementation, the diplexer 110 may comprise suitable circuitry for providing high pass filtering for the receiver-side and low pass filtering for the transmitter-side.

The receiver 120 may comprise suitable circuitry for handling reception of signals. For example, as shown in FIG. 1, the receiver 120 may comprise a wideband low noise amplifier (LNA) 146, a high speed analog-to-digital converter (ADC) 142, and a fast Fourier Transform (FFT) 144, to capture the full spectrum. The receiver 120 may also comprise a balanced to unbalanced (balun) circuit 124 and a match circuit 122. The output of the FFT 144 may be forwarded to the DSP 152, where digital processing may be performed (e.g., to extract and process data carried in the received signals).

In the example implementation shown in FIG. 1, the LNA 146, the ADC 142, and the FFT 144 are implemented within the receive section 126 of the transceiver chip 140, whereas the balun circuit 124 and the match circuit 122 may be implemented as separate circuits (chips) outside the transceiver chip 140. The disclosure is not so limited, however. Thus, in other example implementations some of the circuits in the receive path that are noted as being embedded in the single transceiver chip (e.g., the LNA 146, the ADC 142, and the FFT 144) may be implemented outside it, and/or some of the circuits in the receive path that are noted as being implemented outside the single transceiver chip (e.g., the balun circuit 124 and the match circuit 122, etc.) may be embedded in it (e.g., within the receive section 126 of the transceiver chip 140).

The transmitter 130 may comprise suitable circuitry for handling transmission of signals. For example, as shown in FIG. 1, the transmitter 130 may comprise a transmit (Tx) processing circuit 148, a digital-to-analog converter (DAC) 150, and a highly linear programmable gain amplifier (PGA) 136. The transmitter 130 may also comprise an anti-aliasing filter (AAF) 134 between the DAC 150 and the PGA 136. The PGA 136 may be controlled, such as using a serial peripheral interface (SPI)/general-purpose input/output (GPIO) input and a transmission enable control signal (Tx_En). The input to the Tx processing circuit 148 may be received from the DSP 152, representing output of digital processing functions performed thereby (e.g., to process data for embedding in the transmitted signals).

In the example implementation shown in FIG. 1, the Tx processing circuit 148 and the DAC 150 are implemented within the transmit section 132 of the transceiver chip 140, whereas the AAF 134 and the PGA 136 may be implemented as separate circuits (chips) outside the transceiver chip 140. The disclosure is not so limited, however. Thus, in other example implementations some of the circuits in the receive path that are noted as being embedded in the single transceiver chip (e.g., the Tx processing circuit 148 and the DAC 150) may be implemented outside it, and/or some of the circuits in the receive path that are noted as being implemented outside the single transceiver chip (e.g., the AAF 134 and the PGA 136, etc.) may be embedded in it (e.g., within the transmit section 132 of the transceiver chip 140).

Certain issues may arise in communication systems transmitting and/or receiving signals (e.g., cable systems communicating US cable streams and receiving DS cable streams) under particular conditions. For example, during operation of such system, a particular band may be used for transmitting signals ("transmit band") (e.g., when upstream (US) cable streams are communicated from cable modems to cable headends), and another particular band may be used for receiving signals ("receive band") (e.g., in cable modems to receive downstream (DS) cable streams, carrying cable content, etc. from cable headends). The transmit band and receive band are typically selected to prevent adverse effects (e.g., noise, distortion, interference, etc.) by one on the other. For example, in cable based implementations, the transmit (or upstream) band may be assigned as 5-85 MHz while the receive (or downstream) band may be assigned as 108 MHz to 1 GHz. Nonetheless, noise, distortion, interference, etc. may still occur, in some instances, causing performance degradation. For example, noise, distortion, interference, etc. may be introduced in the transmit (or upstream) band of a particular communication system in certain use scenarios, such as by other communication systems (e.g., by other cable modems, in cable based implementations, that are assigned to other cable users), such as due to defects or misconfiguration, where transmissions by these other communication systems may introduce noise, distortion, interference, etc. into the transmit band assigned to that communication system. This may be addressed by not choosing for transmission frequencies at which the noise, distortion, interference, etc. degrades the performance. Doing so, however, may result in inefficient use of the spectrum.

Therefore, it may be desirable to provide solutions for handling such issues, such as by determining information relating to such noise, distortion, interference, etc. (e.g., source, frequency location, etc.), to allow for preemptive steps to be taken to deal with potential issues, thus reducing downtime, and time spent in resolving network issues and allows for the same resources to be diverted to network maintenance and service enhancement.

Accordingly, in various implementations in accordance with the present disclosure, communication systems may be configured to enable obtaining information relating to noise, distortion, interference, etc. in transmit (upstream) band, and to utilize the information to provide adaptive and optimized handling of the noise, distortion, interference, etc. In this regard, information relating to noise, distortion, interference, etc. may be obtained by incorporating support for spectrum analysis of transmit (upstream) band in the communication system. Use of spectrum analysis may allow assessment of the full transmit band to detect any noise, distortion, interference, etc. therein, and to determine characteristics of any such detected noise, distortion, interference, etc. The noise, distortion, interference, etc. may be handled in different ways, such as by applying in the system, once the information relating to noise, distortion, interference, etc. is obtained, corrective measures based on the information relating to noise, distortion, interference, etc. Alternatively and/or additionally, the information relating to noise, distortion, interference, etc. may be provided to centralized entities/systems (e.g., information relating to noise, distortion, interference, etc. reported it to cable headend(s) in cable based implementations), which may then take or make corrective measures throughout the network(s). Example implementations are described below.

Figure 2:
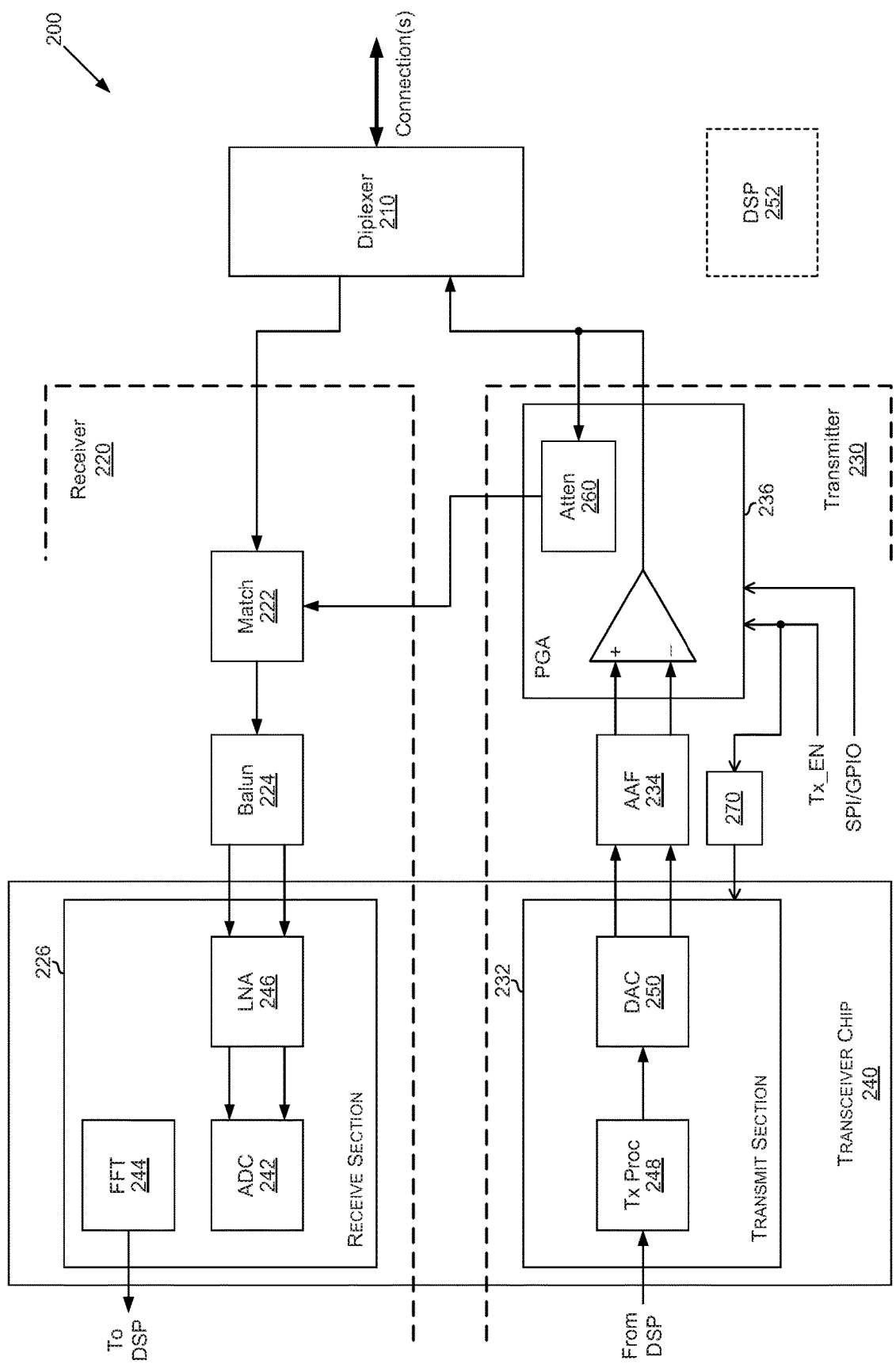
FIG. 2 illustrates an example transmit/receive architecture that supports spectrum analysis of the transmit band, in accordance with the example implementation.

FIG. 2 illustrates an example transmit/receive architecture that supports spectrum analysis of transmit bands, in accordance with the example implementation. Shown in FIG. 2 is transmit/receive (Tx/Rx) circuitry 200.

The Tx/Rx circuitry 200 may be substantially similar to, and may operate in a substantially similar manner as, the Tx/Rx circuitry 100 of FIG. 1, for example. In this regard, similarly named elements in the Tx/Rx circuitry 200 (e.g., a diplexer 210, a receiver 220, a transmitter 230, a low noise amplifier (LNA) 246, an analog-to-digital converter (ADC) 242, a fast Fourier Transform (FFT) 244, a balanced to unbalanced (balun) circuit 224, a match circuit 222, a transmit (Tx) processing circuit 248, a digital-to-analog converter (DAC) 250, a programmable gain amplifier (PGA) 236, and an anti-aliasing filter (AAF) 234) may be substantially similar to, and may operate in substantially manner as, the corresponding elements in the Tx/Rx circuitry 100 of FIG. 1 (e.g., the diplexer 110, the receiver 120, the transmitter 130, the LNA 146, the ADC 142, the FFT 144, the balun circuit 124, the match circuit 122, the Tx processing circuit 148, the DAC 150, the PGA 136, and the AAF 134).

Further, as with the Tx/Rx circuitry 100 of FIG. 1, the Tx/Rx circuitry 200 may also be implemented using a single transceiver chip. In this regard, as shown in FIG. 2, the Tx/Rx circuitry may comprise a single transceiver chip 240, which comprises separate sections, each configured for handling at least some of the functions or operations relating to transmission and/or reception of signals—e.g., a receive section 226 and a transmit section 232, which may be, for example, substantially similar to the receive section 126 and the transmit section 132, as described with respect to FIG. 1. In addition, as with the Tx/Rx circuitry 100 of FIG. 1, in other example implementations some of the circuits as noted as being embedded in the single transceiver chip 240 may be implemented outside it, and/or some of the circuits in the receive path that are noted as being implemented outside the single transceiver chip 240 may be embedded in it. Further, as with the Tx/Rx circuitry 100 of FIG. 1, a digital signal processor (DSP) 252 may be used for providing various processing functions associated with the transmission and reception of signals, particularly digital processing functions.

In addition to the operations described above with respect to the Tx/Rx circuitry 100 of FIG. 1, however, the Tx/Rx circuitry 200 may be configured (e.g., by addition of suitable circuitry) to enable and/or support use of spectrum analysis of the transmit band, such as to enable obtaining information (e.g., source, frequency, etc.) relating to noise, distortion, interference, etc. ingress in the transmit band.

In the implementation illustrated in FIG. 2, for example, the Tx/Rx circuitry 200 may comprise, in addition to the circuits and/or components noted above, an attenuator 260 and a feeder 270. The feeder 270 feeds control signal (Tx_En) into the transmission section 232. The attenuator 260 may comprise suitable circuitry operable to capture and/or provide an attenuated version (or copy) of the transmit band spectrum. The captured version (or copy) of the transmit band spectrum may then be used in the Tx/Rx circuitry 200 (or within the system comprising the Tx/Rx circuitry 200) to determine presence of noise, distortion, interference, etc., if any, in the transmit band, and/or to generate information relating to any detected noise, distortion, interference, etc.

For example, in certain example implementations, the output of the attenuator 260, comprising attenuated version (or copy) of the transmit band spectrum, may be provided to a processing circuitry (e.g., the DSP 252) to process the transmit band spectrum, such as to detect presence of noise, distortion, interference, etc., to determine characteristics of any detected noise, distortion, interference, etc., to select and/or apply corrective measures (if any), to report the information relating to noise, distortion, interference, etc. In this regard, the output of the attenuator 260 may be provided to the DSP 252 in different ways. For example, the output of the attenuator 260 may be inputted (e.g., added) into the receive path, thus the receive input would incorporate the transmit band spectrum, and as such spectrum analysis may be performed on the transmit band spectrum during handling of the receive input.

In the example implementation shown in FIG. 2, the input to the attenuator 260 may be connected to the output of the PGA 236, thus allowing for capturing the transmit band spectrum. The output of the attenuator 260 is then applied to the receive input, such as an input to the match circuit 222. When the attenuator 260 is operating, the output of the attenuator 260 may be incorporated into the receive input, and the transmit spectrum may be processed as part of processing of the receive input—e.g., may be amplified by the LNA 246, and digitized by the ADC 242. Then, when the output of the receive section 226 is provided to the DSP 252, the DSP 252 may perform a spectrum analysis, to obtain information relating to possible ingress noise, distortion, interference, etc. (e.g., noise power as a function of frequency) in the transmit band. The information relating to noise, distortion, interference, etc. may then be used to address the noise, distortion, interference, etc. This may be done within the system—e.g., by applying predefined corrective measure, and/or by providing the information relating to noise, distortion, interference, etc. (e.g., to cable headends in cable based implementations). In this regard, information relating to noise, distortion, interference, etc. may be inputted into the transmit path, to incorporate the information into the transmit input, thus enabling reporting that information (e.g., to cable headend(s)) as part of transmit output (e.g., upstream cable transmission).

The attenuator 260 may be incorporated in different locations within the Tx/Rx circuitry 200, as a separate circuit (chip) or within existing chips. For example, in the example implementation illustrated in FIG. 2, the attenuator 260 is implemented within the PGA 236 (chip). In other implementations, however, the attenuator 260 may be implemented somewhere else—e.g., within the transceiver chip 240, within the match circuit 222, within the same chip that includes both the transceiver and the PGA 236 (when the PGA 236 is not implemented as separate chip), etc. The attenuator 260 may be utilized to enable limiting the energy in the transmit band that is added into the receive path, to minimize possible interference to the receive component.

In an example implementation, the attenuator 260 may be used selectively, to further enhance performance (e.g., limit possible interference). For example, the attenuator 260 may support a high isolation mode, to which it may transition when the PGA 236 is on, so as to avoid any interruption of service on the receiver 220. In such mode, the output of the attenuator 260 may be disconnected from the receiver 220, to prevent the strong transmit output from showing up on the input of the receiver 220. The transmit band spectrum shows up at the receive input only when the PGA 236 is off.

Figure 3:
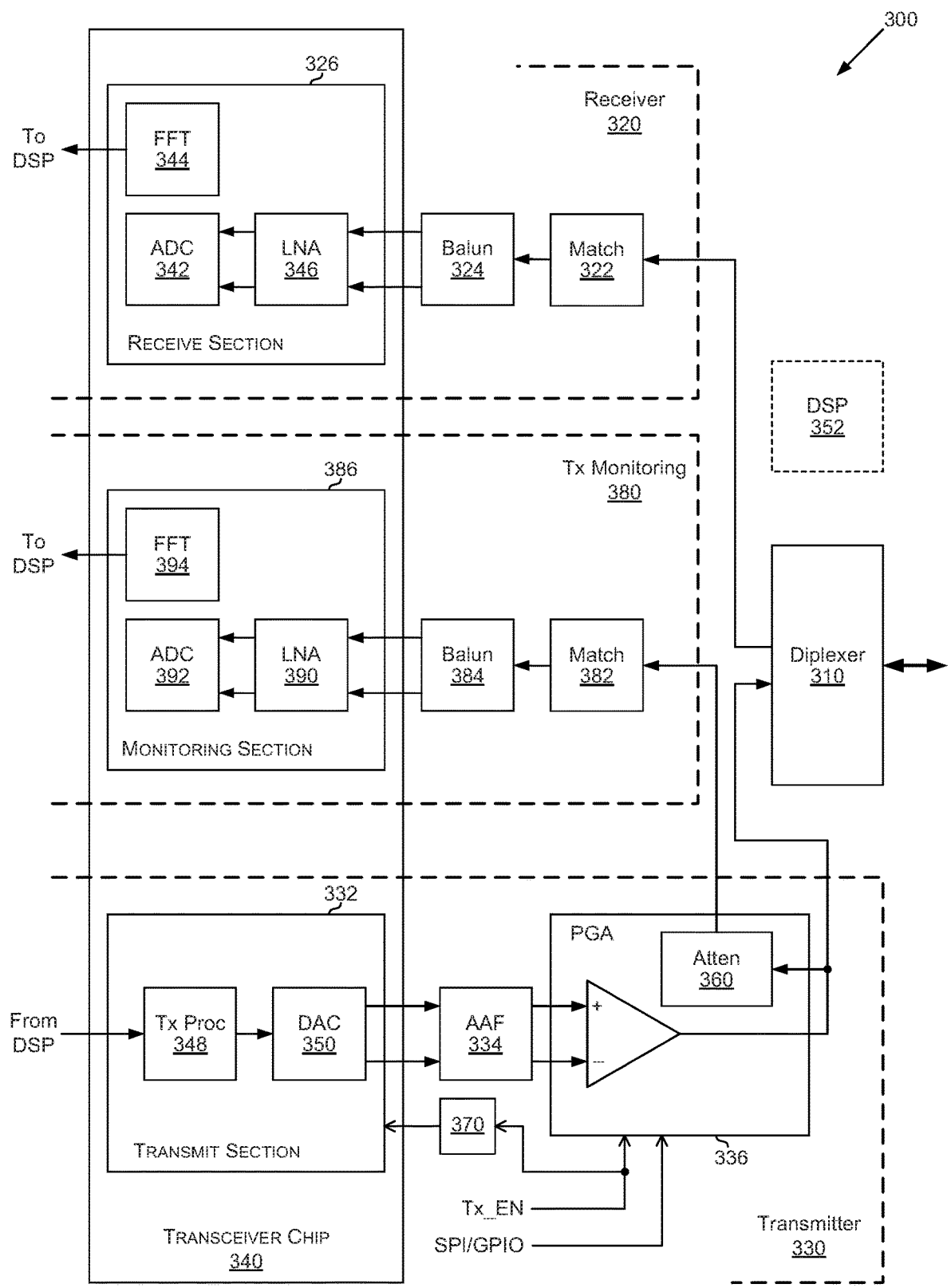
FIG. 3 illustrates another example transmit/receive architecture that supports remote spectrum analysis of the transmit band, in accordance with the example implementation.

FIG. 3 illustrates another example transmit/receive architecture that supports remote spectrum analysis of the transmit band, in accordance with the example implementation. Shown in FIG. 3 is transmit/receive (Tx/Rx) circuitry 300, which may be used in a cable modem (or gateway) that is used in a cable network, to support spectrum analysis of a transmit band.

The Tx/Rx circuitry 300 may be substantially similar to, and may operate in substantially similar manner as, the Tx/Rx circuitry 200 of FIG. 2 (as such, elements having the same reference identifiers as used with respect to Tx/Rx circuitry 200 are used in the Tx/Rx circuitry 300). In this regard, similarly named elements in the Tx/Rx circuitry 300 (e.g., a diplexer 310, a receiver 320, a transmitter 330, a low noise amplifier (LNA) 346, an analog-to-digital converter (ADC) 342, a fast Fourier Transform (FFT) 344, a balanced to unbalanced (balun) circuit 324, a match circuit 322, a transmit (Tx) processing circuit 348, a digital-to-analog converter (DAC) 350, a programmable gain amplifier (PGA) 336, an anti-aliasing filter (AAF) 334, an attenuator 360, and a feeder 370) may be substantially similar to, and may operate in substantially manner as, the corresponding elements in the Tx/Rx circuitry 200 of FIG. 2 (e.g., the diplexer 210, the receiver 220, the transmitter 230, the LNA 246, the ADC 242, the FFT 244, the balun circuit 224, the match circuit 222, the Tx processing circuit 248, the DAC 250, the PGA 236, the AAF 234, the attenuator 260, and the feeder 270)

Further, as with the Tx/Rx circuitry 200 of FIG. 2, the Tx/Rx circuitry 300 may also be implemented using a single transceiver chip. In this regard, as shown in FIG. 3, the Tx/Rx circuitry may comprise a single transceiver chip 340, which comprises separate sections, each configured for handling at least some of the functions or operations relating to transmission and/or reception of signals—e.g., a receive section 326 and a transmit section 332, which may be, for example, substantially similar to the receive section 226 and the transmit section 232, as described with respect to FIG. 2. In addition, as with the Tx/Rx circuitry 100 of FIG. 1 and/or the Tx/Rx circuitry 200 of FIG. 2, in other example implementations some of the circuits as noted as being embedded in the single transceiver chip 340 may be implemented outside it, and/or some of the circuits in the receive path that are noted as being implemented outside the single transceiver chip 340 may be embedded in it. Further, as with the Tx/Rx circuitry 200 of FIG. 2, a digital signal processor (DSP) 352 may be used for providing various processing functions associated with the transmission and reception of signals, particular digital processing functions.

Accordingly, the Tx/Rx circuitry 300 may also be operable (e.g., by addition of suitable circuitry) to support spectrum analysis of the transmit band, such as to enable obtaining information (e.g., source, frequency, etc.) relating to noise, distortion, interference, etc. ingress in the transmit band, particularly by using the attenuator 360 to capture a copy of the transmit spectrum, which may then be analyzed via the DSP 352.

The Tx/Rx circuitry 300, however, may incorporate a separate receive path for use in transmit monitoring—that is, separate than the receiver 320, to avoid any issues that may arise from the inclusion of the transmit spectrum in the receive input. For example, the Tx/Rx circuitry 300 may comprise a transmit (Tx) monitoring receiver 380, which may comprise suitable circuitry for handling reception of signals relating to capture of a copy of the transmit spectrum. The Tx monitoring receiver 380 may be implemented, for example, to be substantially similar to (e.g., copy of) the receiver 320.

Thus, as shown in FIG. 3, the Tx monitoring receiver 380 may comprise a wideband low noise amplifier (LNA) 390, a high speed analog-to-digital converter (ADC) 392, and a fast Fourier Transform (FFT) 394, which may be, for example, substantially similar to the LNA 346, the ADC 342, and the FFT 344 of the receiver 320. These elements may be implemented within a monitoring section 386 of the transceiver chip 340. The Tx monitoring receiver 380 may also comprise a balun circuit 384 and a match circuit 382, which may be substantially similar to the balun circuit 324 and the match circuit 322 of the receiver 320. The balun circuit 384 and a match circuit 382 may be implemented outside the transceiver chip 340. The disclosure is not so limited, however.

The attenuator 360 may be, for example, operable in substantially similar manner as the attenuator 260, as described with respect to FIG. 2. In this regard, the attenuator 360 may be operable to provide an attenuated version of the transmit band spectrum. For example, the input to the attenuator 360 similarly may be connected to the output of the PGA 336, but the output of the attenuator 360 may be applied as input into the Tx monitoring receiver 380 (rather than combined into the receive input), for spectrum analysis. The transmit spectrum may then be processed within the Tx monitoring receiver 380 as described above with respect to FIG. 2 (as part of the receiver 320). For example, the transmit spectrum may be amplified by the LNA 390, and digitized by the ADC 392. When the output of the monitoring section 386 is provided to the DSP 352, the DSP 352 may perform a spectrum analysis, to obtain information relating to possible ingress noise, distortion, interference, etc. in the transmit band. The information relating to noise, distortion, interference, etc. may then be inputted into the transmit path, to enable reporting (e.g., the noise power as a function of frequency) to the cable headend as part of transmit output (e.g., upstream cable transmission).

FIG. 4 illustrates a flowchart of an example process for utilizing spectrum analysis of transmit bands, in accordance with the present disclosure. Shown in FIG. 4 is flow chart 400, comprising a plurality of example steps (represented as blocks 402-410), which may be performed in a suitable system (e.g., Tx/Rx circuitry 200 of FIG. 2, or a system comprising such circuitry) for adaptive handling ingress adverse effects (e.g., noise, distortion, interference, etc.) in transmit bands.

In starting step 402, the system may be setup for operation.

In step 404, transmit band spectrum may be captured (e.g., an attenuated version of the transmit band spectrum may be obtained, such as based on output of transmit path in the system).

In step 406, the captured transmit band spectrum is provided to a processing resource (e.g., a digital signal processor). This may be done in various ways, such as by incorporating the capture transmit spectrum into normal receive input, by handling it via a dedicated monitoring reception path, etc.

In step 408, the captured transmit band spectrum may be processed—e.g., to detect presence of adverse effects (e.g., noise, distortion, interference, etc.), and/or to determine for each detected adverse effect corresponding data.

In step 410, detected adverse effects (e.g., noise, distortion, interference, etc.) may be handled—e.g., corrective measures are selected and/or applied, related information is compiled and reported to remote system (e.g., headend) to take corrective measures, etc.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    one or more transmit circuits that are operable to process transmit signals for transmission over a transmit band;
    a capturing circuit that is operable to:
        capture a transmit band spectrum corresponding to said transmit band used in transmitting said transmit signals; and
        generate a capture output comprising said captured transmit band spectrum;
    one or more receive circuits that are operable to process receive signals originating from sources external to the system, wherein:
        said receive signals are inputted into one of the one or more receive circuits; and
        a receive circuit of the one or more receive circuits is configured to incorporate said capture output into said receive signals; and
    a processing circuit that is operable to:
        process a receive circuit output of said one or more receive circuits, said receive circuit output comprising said captured transmit band spectrum;
        detect based on said processing of said receive circuit output, presence of adverse effects in said transmit band spectrum;
        determine for each instance of detected adverse effects, one or more characteristics associated with said detected adverse effects; and
        based on determined characteristics associated with said detected adverse effects, select and apply corrective measures directed to mitigating at least some of said adverse effects.

2. The system of claim 1, wherein said processing circuit is operable to generate reporting information related to said detection of adverse effects and/or to said determined one or more characteristics associated with each instance of detected adverse effects to at least one remote system.

3. The system of claim 2, wherein said one or more transmit circuits are operable to incorporate said reporting information into said transmit signals.

4. The system of claim 1, wherein said processing circuit comprises a digital signal processor (DSP).

5. The system of claim 1, wherein said capturing circuit comprises an attenuator that is operable to obtain an attenuated version of said transmit band spectrum.

6. The system of claim 1, wherein one of said one or more transmit circuits comprises said capturing circuit.

7. The system of claim 6, wherein said one of said one or more transmit circuits further comprises a programmable gain amplifier.

8. The system of claim 1, wherein said one or more transmit circuits comprise a programmable gain amplifier circuit.

9. The system of claim 1, wherein said processing circuit is configured for processing said captured transmit band spectrum incorporated in said output of said one or more receive circuits.

10. The system of claim 1, wherein said one or more receive circuits comprise a match circuit.

11. The system of claim 1, comprising a single transceiver chip; and
    wherein at least one of said one or more transmit circuits and at least one of said one or more receive circuits are embedded within said single transceiver chip.

12. The system of claim 1, wherein said one or more transmit circuits comprises a transmit (Tx) signal processing circuit.

13. The system of claim 1, wherein said one or more transmit circuits comprises a digital-to-analog converter (DAC).

14. The system of claim 1, wherein said one or more receive circuits comprises an amplifier circuit.

15. The system of claim 1, wherein said one or more receive circuits comprises an analog-to-digital converter (ADC) circuit.

16. The system of claim 1, wherein said one or more receive circuits comprises a fast Fourier Transform circuit.

17. The system of claim 1, wherein said one or more receive circuits comprises a balance-to-unbalanced (balun) circuit.

18. A method comprising:
    in a communication system that supports transmission of signals over a transmit band:
        capturing a transmit band spectrum corresponding to said transmit band used in transmitting said signals;

generate a capture output comprising said captured transmit band spectrum;

generating a combined receive signal comprising said captured transmit band spectrum, said generating comprising incorporating said capture output into receive signals originating from sources external to said communication system;

processing said combined receive signal comprising said captured transmit band spectrum;

detecting based on said processing of said combined receive signal, presence of adverse effects in said transmit band spectrum;

determining for each instance of detected adverse effects, one or more characteristics associated with said detected adverse effects; and based on determined characteristics associated with said detected adverse effects, selecting and applying corrective measures directed to mitigating at least some of said adverse effects.

19. The method of claim 18, further comprising:

generating reporting information related to said detection of adverse effects and/or to said determined one or more characteristics associated with each instance of detected adverse effects; and communicating said reporting information to at least one remote system.

20. The method of claim 18, wherein capturing said transmit band spectrum comprises generating an attenuated version of said transmit band spectrum.

* * * * *